July 5, 1966　　　S. N. CRAIG ETAL　　　3,259,108
BOILERS
Filed May 12, 1964　　　　　　　　　　　10 Sheets-Sheet 1
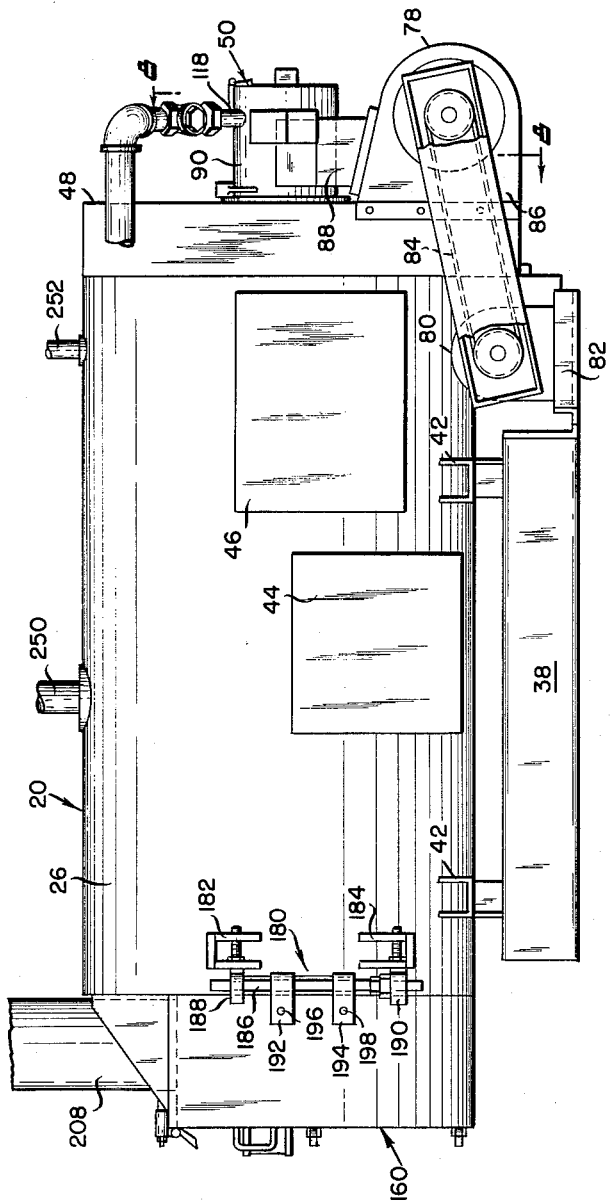
INVENTORS
Sam N. Craig
Peter B. Seasholtz
BY
ATTORNEYS

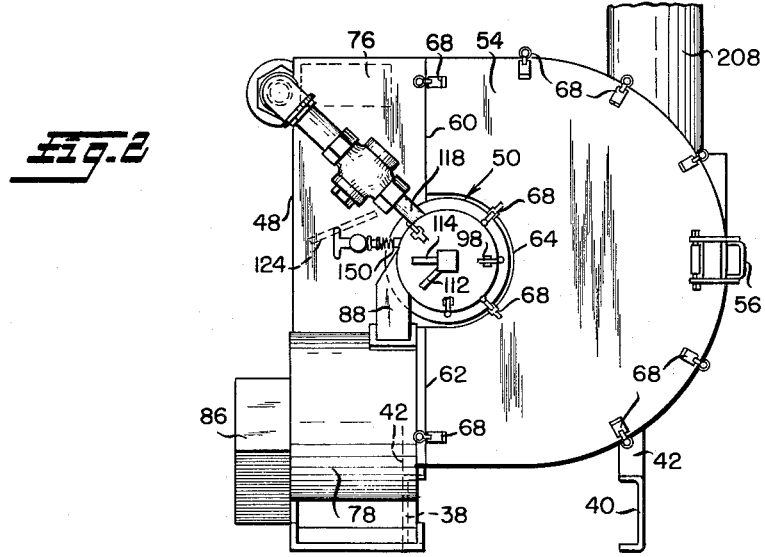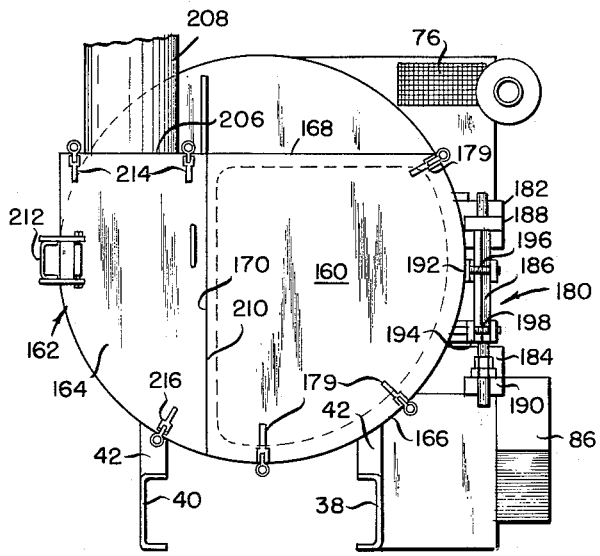

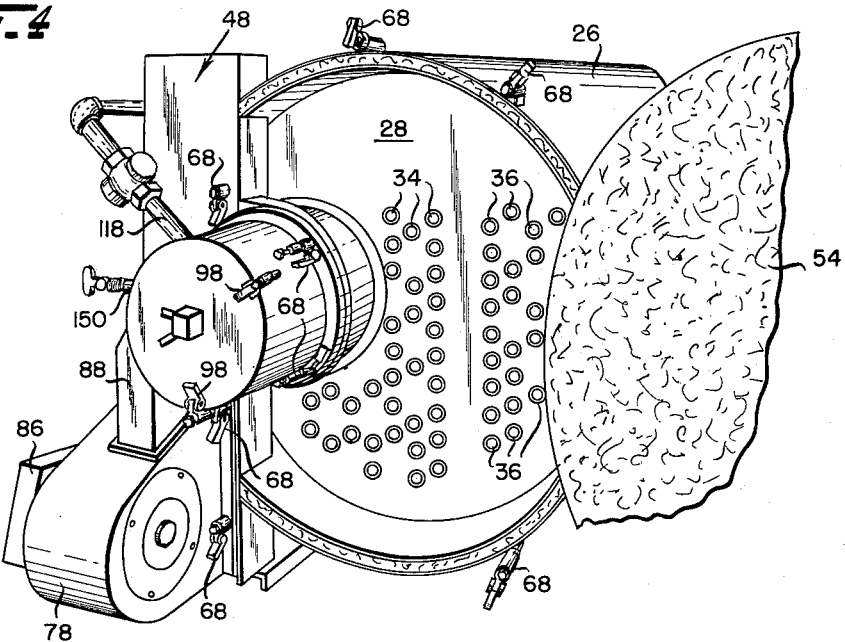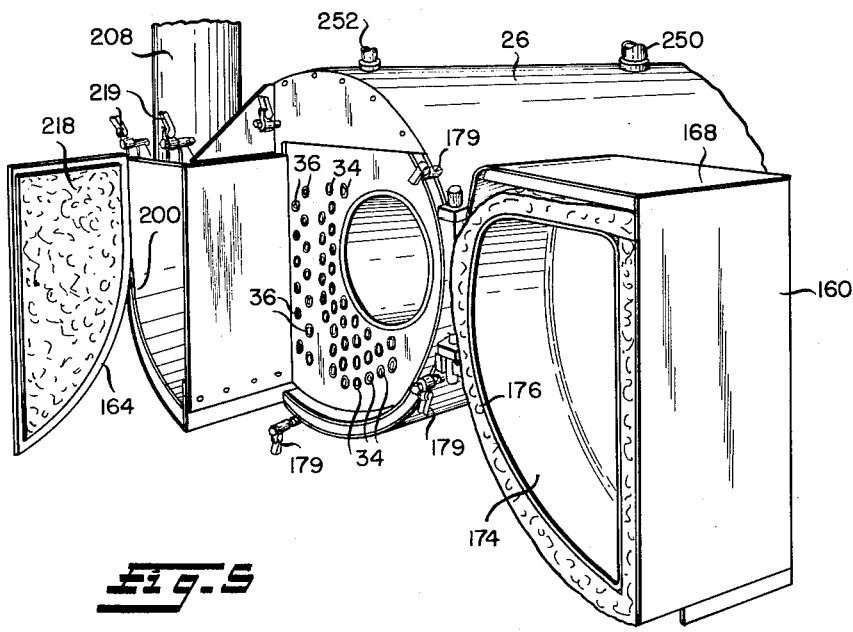

INVENTORS
Sam N. Craig
Peter B. Seasholtz

July 5, 1966 S. N. CRAIG ET AL 3,259,108
BOILERS

Filed May 12, 1964 10 Sheets-Sheet 7

INVENTORS
Sam N. Craig
Peter B. Seasholtz

BY *Strauch, Nolan & Neale*
ATTORNEYS

July 5, 1966   S. N. CRAIG ETAL   3,259,108
BOILERS
Filed May 12, 1964   10 Sheets-Sheet 8

INVENTORS
Sam N. Craig
Peter B. Seasholtz

BY *Strauch, Nolan & Neale*
ATTORNEYS

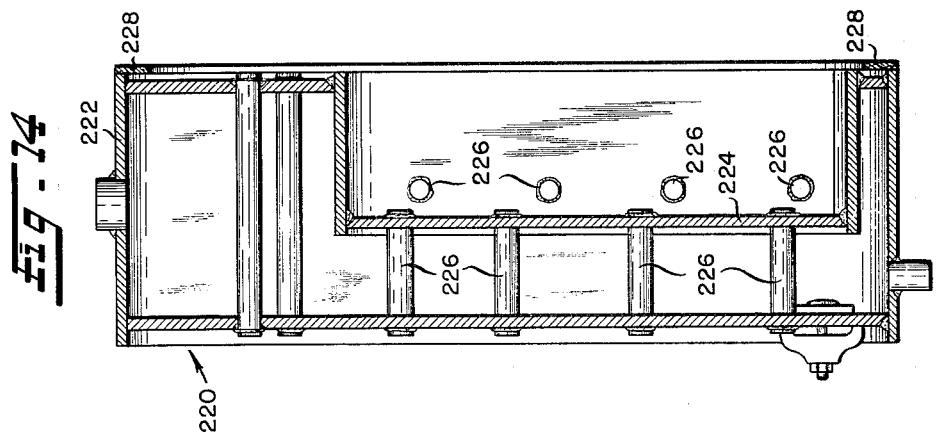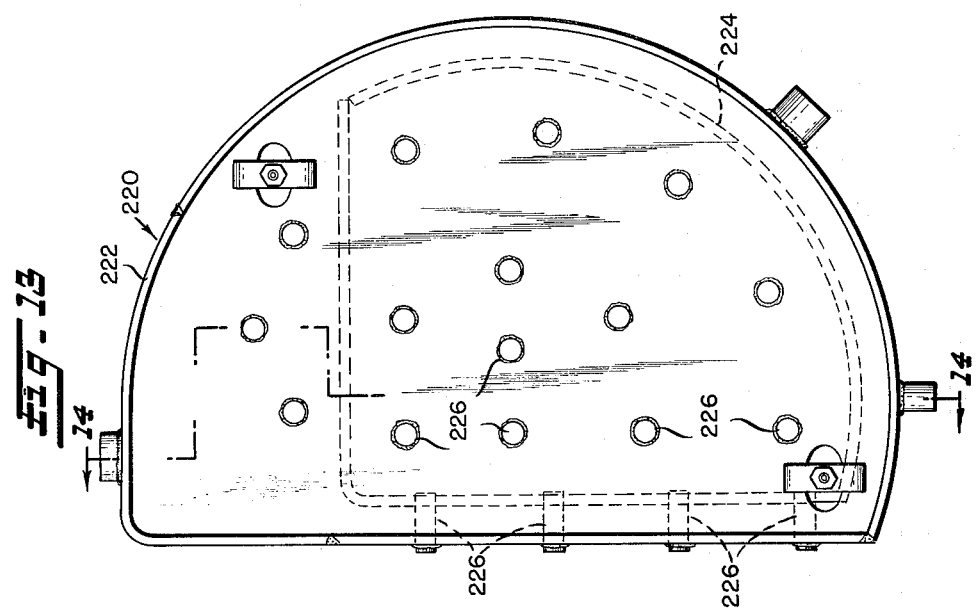

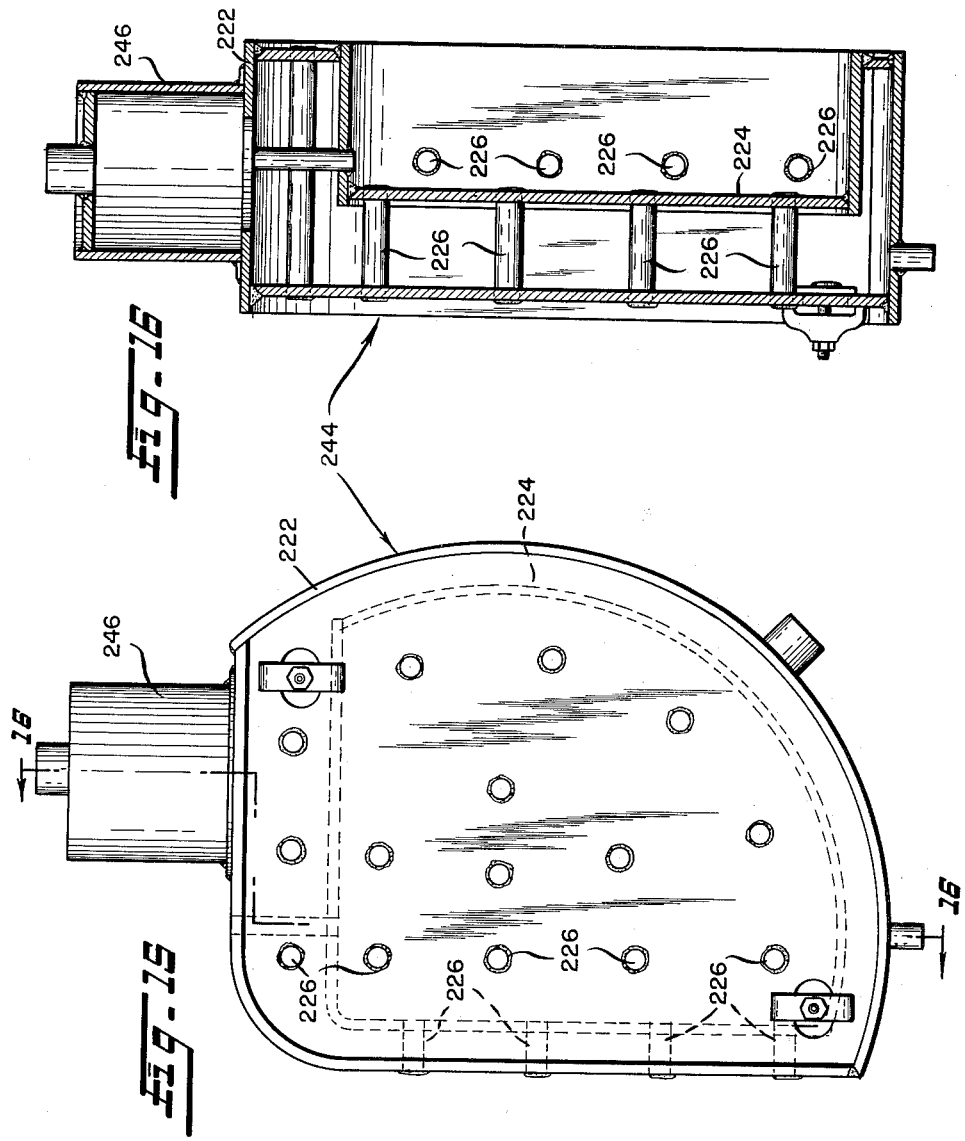

3,259,108
BOILERS
Sam N. Craig, Devon, Pa., and Peter B. Seasholtz, Kewanee, Ill., assignors to Orr & Sembower, Inc., Reading, Pa., a corporation of Pennsylvania
Filed May 12, 1964, Ser. No. 369,344
2 Claims. (Cl. 122—149)

This application is a continuation-in-part of our application Serial No. 73,764, filed December 5, 1960, for Boilers, and now abandoned.

This invention relates to boilers for generating steam or hot water and more particularly the fire tube boilers of the so-called packaged type which are assembled at the factory and shipped ready for use upon connection of the fuel, water and electrical supply circuits.

Boilers of this general type have won widespread acceptance in the heating field in recent years and have been widely used for the heating of schools, factories and a wide variety of commercial establishments. Such boilers have been manufactured and sold in a number of basic forms to meet the needs and preferences of individual users. For example, such boilers have been provided with a so-called wetback construction or a dryback construction and have been provided with combustion apparatus operable with liquid fuels or with gaseous fuels. Often economic conditions dictate the use of gaseous fuel during a portion of the year and use of liquid fuel during the remainder of the year. To meet this requirement the boiler of the present invention is provided with combustion apparatus which operates with high efficiency with either fuel and which may be instantly converted from one fuel to the other.

The preference for a wetback or a dryback construction is largely a matter of individual engineering judgment. After a period of use of a boiler of one type it is often indicated that a boiler of the other type is preferable. The present invention also affords convertibility in this respect by providing a unique construction by which the necessary conversion may be effected at minimum cost and with minimum down time.

With the foregoing consideration in mind it is the principal purpose and object of the present invention to provide packaged automatic fire tube boilers which have a versatility, efficiency of operation, dependability and accessibility not offered by any known prior design.

It is a further object of the present invention to provide improved fire tube boilers in which the burner combustion tube and the fire tubes are disposed in a unique manner to promote the positive natural circulation of the water and employ counterflow heat transfer throughout, thereby minimizing temperature differentials and thermal shocks within the boiler and increasing the efficiency of the boiler in operation. In attaining this object, the invention provides a unique water circulation system which, as applied to a three pass boiler, assures that the incoming water passes naturally in counterflow direction downwardly through the third pass to the bottom of the boiler and then forms two streams as it rises through the second pass tubes and over the combustion tube. This natural circulation pattern also prevents the accumulation of sludge and resulting hot spots in the bottom portion of the boiler.

It is also an object of the present invention to provide improved fire tube boilers in which a unique structure is provided to permit the conversion of the boiler from a wetback to a dryback configuration and vice versa at minimum expense and with minimum lost time.

It is an additional object of the present invention to provide improved fire tube boilers in which a wetback is arranged to be opened without disconnecting the water lines to permit direct visual observation of the fire tubes and tube sheet when the unit is subjected to hydrostatic tests.

It is a further object of the present invention to provide improved boilers having novel front and rear door constructions which permit the opening of the front door without removal of the burner or associated piping or wiring and which permit the opening of a part or entire rear of the boiler for inspection, cleaning or repair easily and with minimum space requirements, thus, increasing the flexibility of boiler room layouts.

It is also an object of the present invention to provide a unique rear door construction for a fire tube boiler in which the turn around space connecting the combustion tube and the second pass is incorporated in the door and in which the seal about the turn around space is made in a single plane against the tube sheet, thus eliminating the need for construction of the apparatus to close tolerances, the need for internal baffles and preventing the short circuiting of the combustion gases directly to the stack, should leakage occur.

It is an additional object of the present invention to provide improved combustion apparatus for boilers which permits the quick and automatic change-over between oil and gas and which provides increased efficiency of operation particularly when operating with gaseous fuels.

It is a further object of the present invention to provide improved boilers having novel means for preheating the incoming combustion air which also provides the advantage of reducing the over-all noise level of the apparatus.

Additional objects and advantages of the present invention will become apparent as the description proceeds in connection with the accompanying drawings in which:

FIGURE 1 is a side elevation of the improved boiler constructed in accordance with the present invention;

FIGURE 2 is a front elevation of the boiler;

FIGURE 3 is a rear elevation of the boiler showing one form of dryback construction;

FIGURE 4 is a perspective view of the front of the boiler showing the front door or cover in open position;

FIGURE 5 is a perspective view of the rear of the boiler showing both rear doors in open position;

Figure 8:
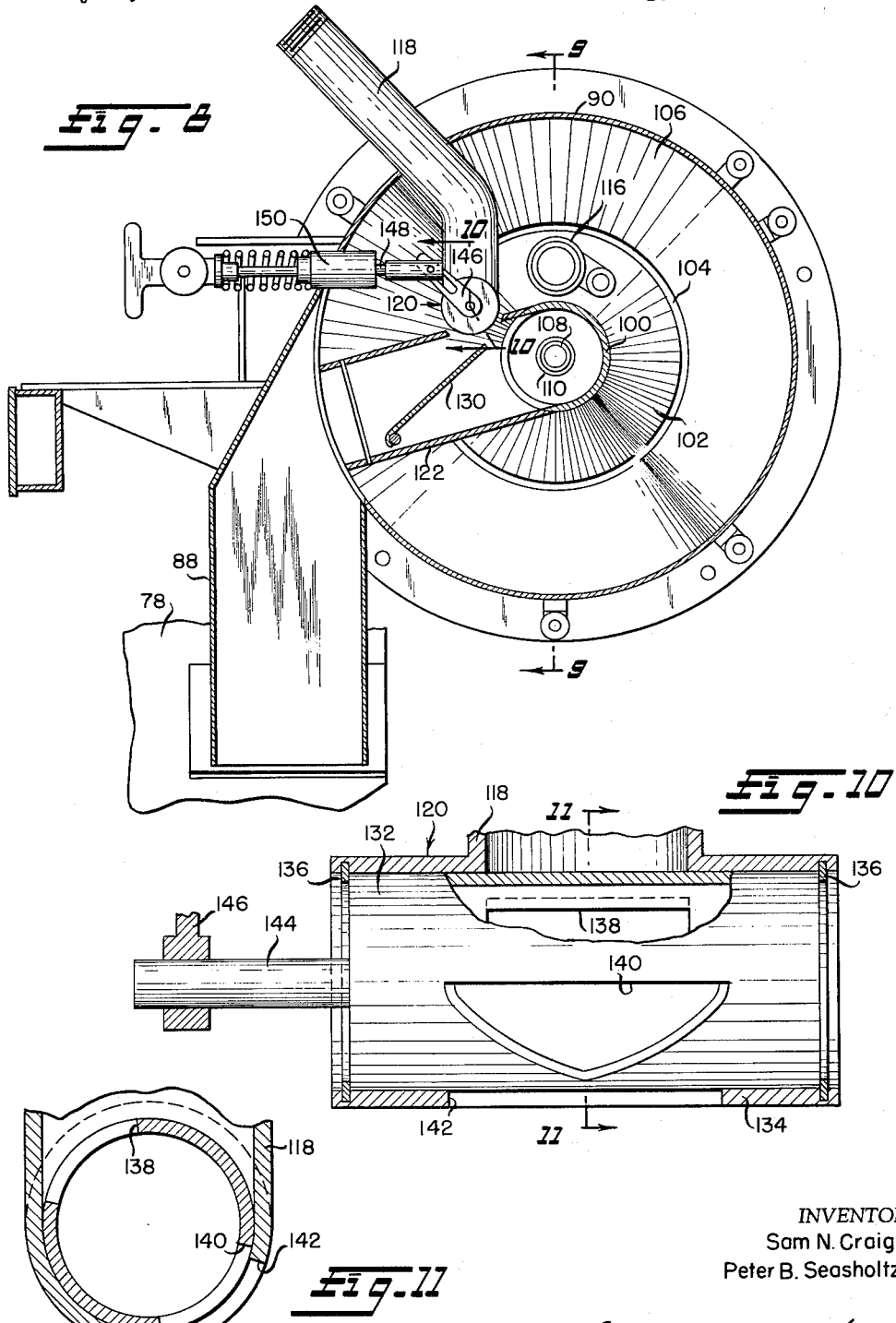
FIGURE 8 is a vertical section taken along line 8—8 of FIGURE 1 illustrating details of the air and gas supply conduits and valve mechanisms.
Figure 9:
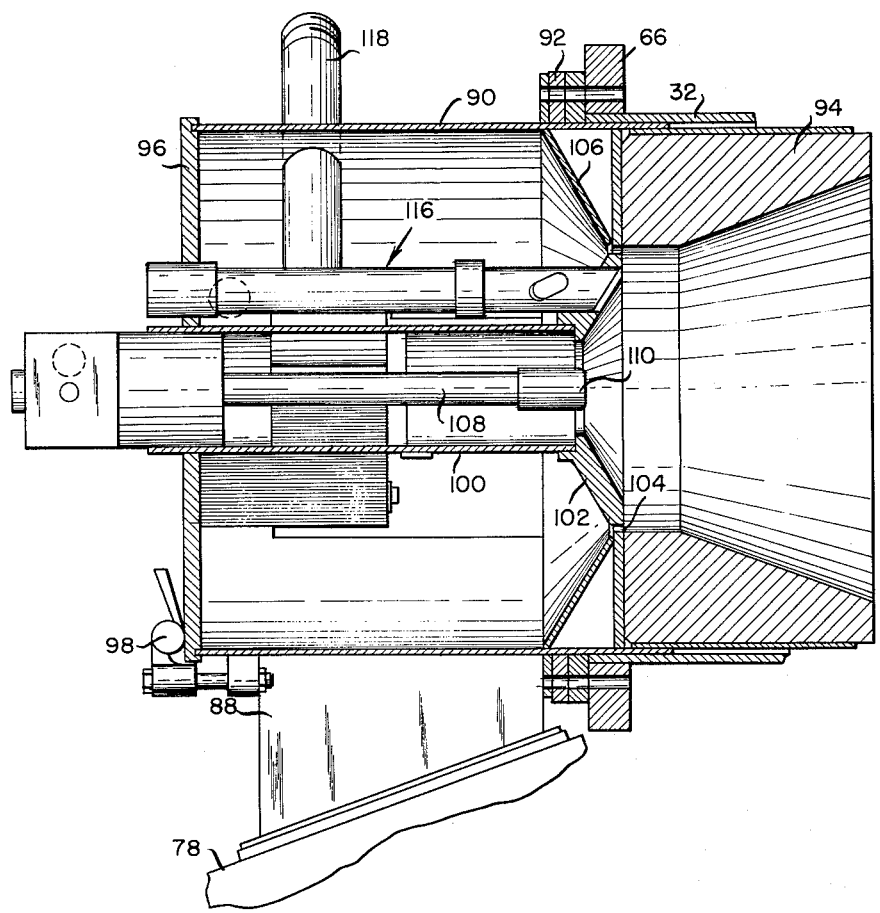
Figure 12:
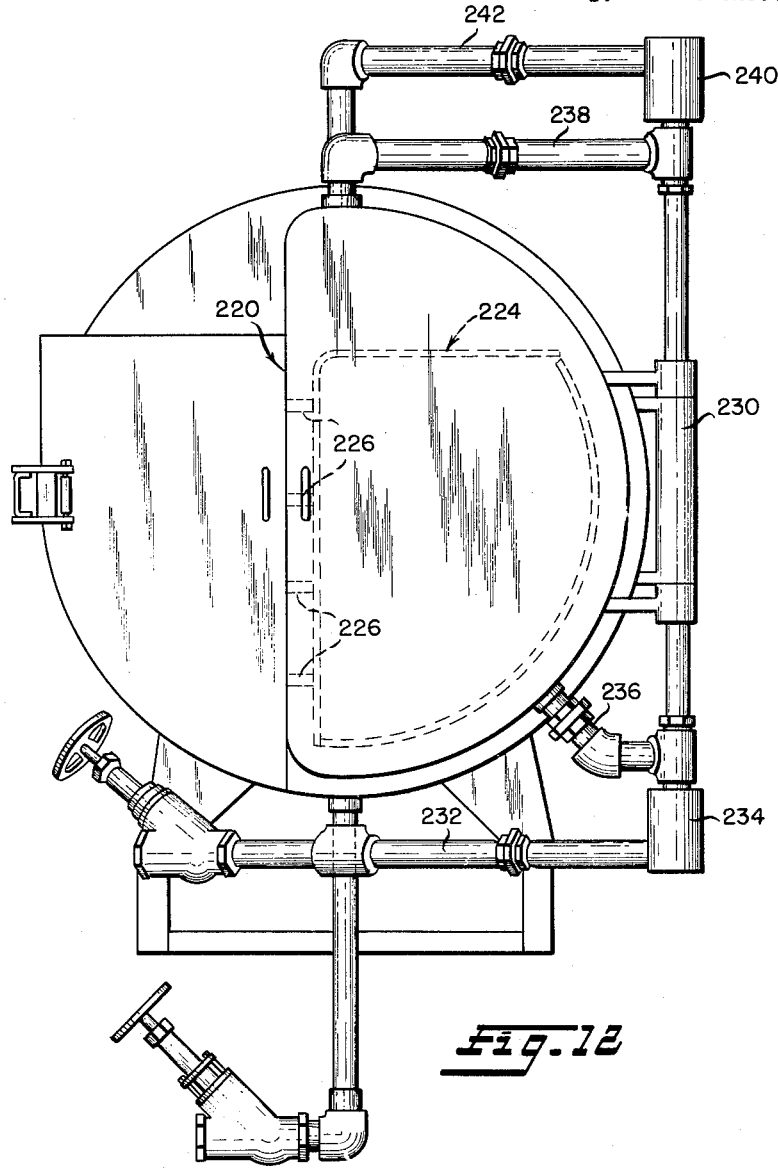

FIGURES 9 and 10 are sections taken along line 9—9 and 10—10, respectively, of FIGURE 8 showing details of construction;

FIGURE 11 is a transverse section taken along line 11—11 of FIGURE 10;

FIGURE 12 is a rear elevation of a modified form of the boiler incorporating a swinging wetback construction;

FIGURE 13 is a rear elevation of the swinging wetback of FIGURE 12 removed from the boiler;

FIGURE 14 is a vertical section taken along line 14—14 of FIGURE 13 showing details of construction of the swinging wetback;

FIGURE 15 is a rear elevation of a modified form of swinging wetback construction removed from the boiler; and FIGURE 16 is a vertical section taken along line 16—16 of FIGURE 15 showing interior details of construction.

As indicated above the boiler of the present invention is a fully automatic packaged unit. As such, it will be equipped with means for automatically initiating combustion in response to demand for heat and a control system providing for full range modulation of the burner to insure constant combustion efficiency from 20% to 100% of full rated load. However, since the present invention is concerned with details of the boiler, per se, and the combustion apparatus, the various automatic controls and associated equipment, which are conventional, will be omitted for clarity.

Referring now more particularly to the drawings, the main body portion 20 of the boiler which is of elongated cylindrical configuration is formed by a cylindrical boiler shell 22, the outer surface of which is covered by a layer of insulating material 24 held in place by a relatively thin outer sheet metal cover 26. The ends of the water compartment are formed by front and rear tube sheets 28 and 30, respectively suitably welded to the boiler shell 22. Extending between and welded to the tube sheets 28 and 30 is a combustion tube 32, a group of tubes 34 forming a second pass for the combustion products and a group of tubes 36 forming the third pass.

Figure 6:
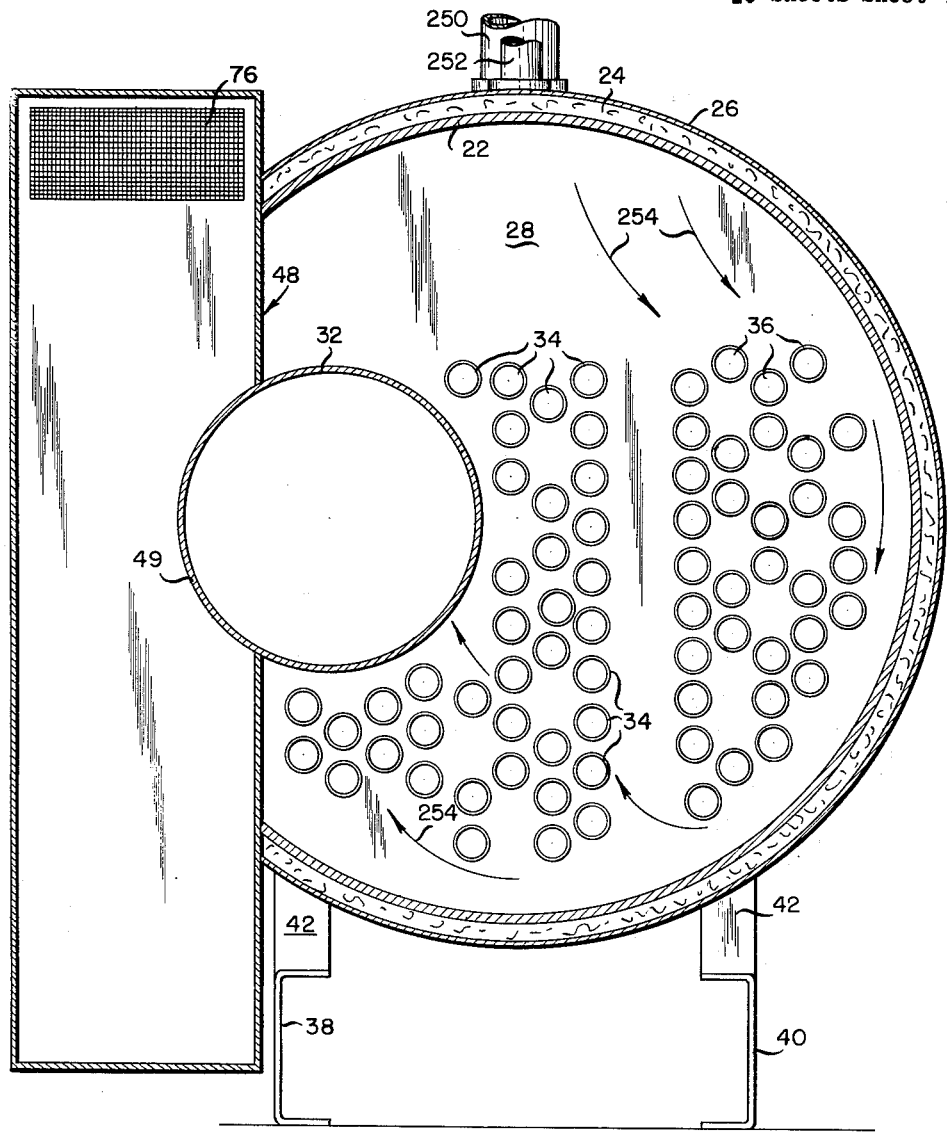
FIGURE 6 is a vertical section taken along line 6—6 of FIGURE 7 illustrating the disposition of the main combustion tube, the second and third pass fire tubes and the air preheat conduit.
Figure 7:
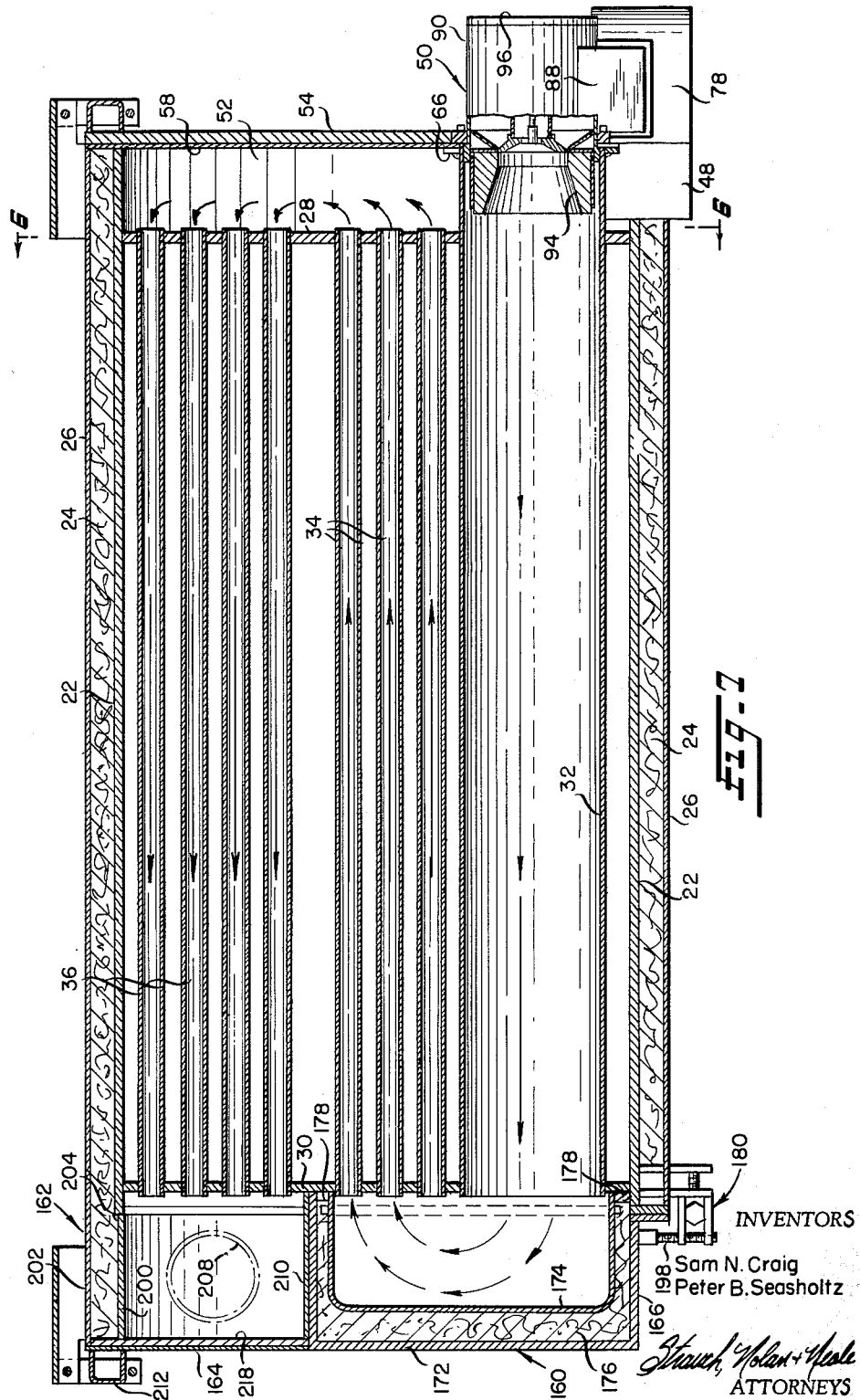
FIGURE 7 is a horizontal section through the center of the combustion tube.

As best shown in FIGURES 2, 6 and 7, the axis of the combustion tube 32 is substantially in a horizontal plane containing the axis of the boiler shell 22 but is offset a substantial distance from the vertical plane containing the axis of the boiler shell 22. The second pass tubes 34 extend from a level adjacent the uppermost portion of the combustion tube 32 downwardly along the side of the combustion tube and laterally around the lower portion of the combustion tube. The third pass tubes 36 are arranged in a generally vertical pattern at the side of the boiler opposite the combustion tube and extend from an area approximately at the level of the uppermost portion of combustion tube 32 downwardly to a point adjacent the lower portion of the boiler shell. Many of the advantages of the boiler of the present invention are realized from this unique disposition of the combustion tube and the fire tubes particularly in combination with other features of the boiler construction as explained in detail below.

For convenience in shipping the boiler and mounting the boiler for use, the entire assembly is supported on longitudinally extending skid rails 38 and 40 connected by suitable brackets 42 directly to the boiler shell. Also, in accordance with conventional practice suitable brackets, plates or cabinets, for example, those shown at 44 and 46, are provided to accommodate the various control components normally associated with the boiler. While such control components form no part of the present invention, it is of significance that all of these units are mounted on the boiler on the side toward which the combustion tube is offset.

An air inlet conduit indicated generally at 48 is mounted at the front of the boiler and extends vertically of the boiler from a point adjacent the uppermost portion of the outer shell 26 to a point below the bottom of the boiler. Adjacent its midpoint the conduit 48 is provided with an arcuate notch 49 to accommodate the combustion apparatus indicated generally at 50 and the combustion tube 32. The outer vertical edge of the conduit projects slightly outwardly beyond the outermost portion of the boiler cover 26. The front surface of the conduit 48 is substantially flush with the projecting portion of the main boiler shell 22 which forms the front turn around space 52 connecting the second and third pass tubes at the front of the boiler.

It is a feature of the present invention that the turn-around space 52 is covered by a single door 54 which, as shown in FIGURE 2, is of D shaped configuration and is mounted for swinging movement by a single hinge 56 at the side of the boiler opposite the combustion tube 32. If desired, davits rather than hinges may be used to support the door for swinging movement. The door 54 is provided with a layer of insulation 58 on its inner surface which insulates the turn around space 52 and which sealingly engages the periphery of the boiler in the region not occupied by the conduit 48. The seal at the front of the boiler is completed by vertical edge portions 60 and 62 of the door 54 which overlap the adjacent portions of the conduit 48 and by a central C shaped section 64 which sealingly engages a flange 66 welded to the forwardly projecting end of the combustion tube 32.

The door is held in closed sealing position by a suitable number of clamps 68 which permit the door to be opened in a matter of seconds when inspection or maintenance is required. Since all of the piping, controls, wiring and other components associated with the combustion apparatus 50 are located to the left of the combustion tube, as viewed in FIGURE 2, the door 54 may be opened, as shown in FIGURE 4, without disconnecting or disassembling any of these components. Thus, substantially the entire front tube sheet, the combustion tube and both groups of fire tubes may be exposed for inspection or repair with a speed and convenience not approached by prior comparable units.

The combustion apparatus 50 and air and fuel supply will now be described with particular reference to FIGURES 1, 4, 8, 9, 10 and 11. Combustion air enters the apparatus through an air inlet opening 76 (FIGURES 3 and 6) at the upper rear face of the air inlet conduit 48 and is drawn downwardly through the conduit 48 in heat exchange relation with the combustion tube 32 and tube sheet 28 by a fan 78 secured by any suitable means to the front surface of the conduit 48 adjacent its lower end. The fan 78 is driven by a motor 80 adjustably mounted on a bracket assembly 82 carried by the front end of the rail 38, the drive connection being effected by a belt 84 covered by a suitable guard 86.

The air is delivered by the fan through a vertical conduit 88, the upper end of which leads tangentially into a cylindrical burner housing 90. Adjacent its inner end the housing 90 is provided with a radial flange 92 for attachment to the flange 66 on the combustion tube, the portion of the housing 90 beyond the flange 92 being telescoped within the outer end of the combustion tube 32. At its inner end the housing 90 carries a refractory venturi 94 which is also disposed wholly within the projecting outer end of the combustion tube 32.

A cover 96 is detachably secured to the outer end of housing 90 by a plurality of clamps 98. The cover 96 carries a primary air tube 100 in axial alignment with the combustion tube 32. The inner end of the tube carries an air cone 102, the periphery of which is suitably spaced from the upstream end of the refractory venturi 94 to provide an annular secondary air passage 104. A conical deflector 106 is mounted on the inner surface of the main shell 90 to promote the smooth passage of secondary air toward the annular passage 104.

Mounted within and coaxially of the primary air tube 100 is an oil tube 108, the inner end of which is provided with a conventional atomizing nozzle 110 and the outer end of which is connected to suitable fuel and air lines 112 and 114, respectively. Also carried by the cover plate 96 is an igniter assembly 116, the inner end of which extends through the air cone 102. Gaseous fuel is supplied to the burner through a conduit 118, the inner end of which is in communication through a valve assembly 120 with a radial conduit 122 which conducts a portion of the air from the conduit 88 directly to the interior of the primary air tube 100.

The location of the gas valve 120 within the housing 90 substantially eliminates the danger of leakage associated with prior externally located valves.

The remainder of the air entering the casing 90 through the conduit 88 passes circumferentially through the space between the casing 90 and the outer surface of the primary air tube and thence outwardly through the secondary air passage 104 in a spiral pattern.

The total air flow is regulated by a damper 124 (FIGURE 2) mounted in the air inlet conduit 48 ahead of the fan 78. The relative amount of air flowing through the primary and secondary air circuits is controlled by a damper 130 pivotally mounted in the primary air conduit 122 and having its free end disposed closely adjacent to the gas valve 120. Alternately, the primary air damper may be positioned in the conduit 88 between the blower and the burner plenum.

As best shown in FIGURES 10 and 11, the gas valve assembly 120 includes a cylindrical hollow body 132 rotatably mounted in a transverse cylindrical end portion 134 of the conduit 118, the valve body 132 being held in place by snap rings 136. The tubular body 132 is provided with an inlet opening 138 and an outlet opening 140, the former being rectangular and the latter being V shaped and being effective upon rotation of the body 132 to move into and out of alignment with the outlet opening 142 formed in the wall of the cylindrical portion 134 at the end of the gas conduit 118. One end of the tubular valve body 132 carries an operating shaft 144 to the outer end of which is non-rotatably secured an operating arm 146. The arm 146 is shifted by a control rod 148 which is slidably mounted in a sleeve 150 carried by the cylindrical casing 90 and the outer end of which is engageable with a modulating control mechanism not shown.

Because of the location of the gas outlet opening 142 adjacent the lip of the damper 130, the primary air and gas are introduced into the primary air tube 100 tangentially thereof and flow in a spiral path toward the outlet or downstream end of the primary air tube 100 and issue into the refractory venturi 94 where they are joined by a surrounding layer of secondary air. Thus the apparatus is effective to produce a rotating mass consisting of an inner layer of primary air, a surrounding layer of gaseous fuel and an outer layer of secondary air which assures intimate mixture of the gas and air and combustion efficiency of a very high order.

Mixing of the fuel and air is also promoted by the fact that primary air, secondary air and the gas are all supplied at different pressures.

Conventional controls, which need not be described here, are utilized to provide coordinated control of the damper 124, the damper 130 and the valve assembly 120 to provide full modulated control over a wide range of heating requirements.

Certain unique advantages are also derived from the combustion air supply arrangement, in particular the position of the air inlet conduit 48, the location of the damper 124 and the relation of air duct to the boiler and the fan 78. For example, the location of the air conduit in heat exchange relation with the combustion tube and tube sheet assures a substantial amount of pre-heat for the incoming combustion air without the losses which are associated with prior pre-heat arrangements. The pre-heat is effected without appreciably cooling the heated water within the boiler since two walls of the conduit 48 are in direct heat exchange relation with the flue gases. This arrangement also produces a more stable fire since the air is raised to a higher temperature at reduced boiler capacity, thus creating a more stable flame at low loads.

Also, the inlet air duct produces automatic silencing and substantially reduces combustion and fan noise, thus eliminating the need for the muffler usually employed in air inlet conduits. Further, the air inlet conduit 48 permits the installation of the main air flow control damper 124 at a point upstream of the fan 78 which significantly reduces the power requirements when the damper 124 is moved into flow restricting position.

At the rear of the boiler there is provided a unique split door construction which is readily adaptable to wetback or dryback construction. In the form of the invention shown in FIGURES 1 through 6 which will now be described in detail, a dryback construction is illustrated. In this form of the invention, a combined door and gas reversal chamber assembly indicated generally at 160 encloses and seals the turn around space at the rear end of the combustion tube 32 and the adjacent ends of the second pass fire tubes 34 and an entirely separate chamber assembly indicated generally at 162 and having a separate door 164 encloses and seals the space at the outlet end of the third pass fire tubes 36.

The door assembly 160 comprises a sheet metal housing having a side wall 166 formed on essentially the same radius as the boiler shell 22, a flat top wall 168 extending across the boiler just above the level of the combustion tube 32 and the uppermost ones of the fire tubes 34, a vertical side wall 170 connecting the adjacent ends of the top and side walls 168 and 166 and extending vertically between the second and third pass fire tubes 34 and 36, and a flat end wall 172.

The door assembly carries a relatively thin refractory liner 174 which is set in a bed of lightweight porous insulating material 176. The door assembly 160 is provided with an asbestos or similar temperature resistant peripheral sealing strip 178 which forms a gas tight seal enclosing the entire gas reversal chamber at the end of the combustion tube 32 and the fire tubes 34. It is to be particularly noted that, contrary to prior constructions, the entire seal at this point is made in a single plane against the tube sheet, thus eliminating the need for seals at parallel offset surfaces which characterize prior constructions. The door is held in closed sealing position by a series of manually releasable clamps 179.

The door assembly 160 is mounted for swinging movement between the closed position shown in FIGURES 3 and 7 and an open position shown in FIGURE 5 by a hinge construction 180 carried by upper and lower brackets 182 and 184 rigid with the boiler shell 22. The hinge construction includes a vertical pin 186 rotatably supported in upper and lower holders 188 and 190 adjustably secured to the respective brackets 182 and 184 to permit adjustment of the position and the inclination of the axis of pin 186. The pin 186 carries upper and lower brackets 192 and 194 through which attaching bolts 196 and 198 carried by the door assembly 160 adjustably extend. This hinge construction permits adjustment of the door assembly 160 in planes parallel to and normal to the axis of the boiler and the utilization of single plane sealing. A perfect seal can be readily established and maintained without the need for manufacturing the parts to close tolerances. In boilers of larger size double davits may be substituted for this hinge construction, the davits being constructed to permit the same adjustments of the door position.

If, after a period of use, the refractory liner 174 becomes burned or damaged, the entire door assembly may be replaced to permit substantially uninterrupted operation of the boiler. Since a custom fit is not required, the change can be made readily in the field using standard parts. Also, since the refractory portion of the door 160 is in the form of a relatively thin liner, it is a relatively easy matter to remove the damaged liner and replace it.

The chamber 162 at the outlet end of the third pass fire tube 36 is formed by inner and outer sheet metal wall sections 200 and 202 containing an insulating material in the space between them, the inner edge of the members 200 being welded to the projecting end of the boiler shell 22 as at 204 and the outer wall 202 forming a continuation of the sheet metal cover 26. The top of the assembly 162 is formed by a horizontal sheet metal wall 206 forming an extension of the top wall 168 of the door assembly 160 and having an opening in which a vertical stack 208 is secured. The inner side wall of the assembly 162 is formed by a vertically extending sheet metal plate 210 bolted to rear tube sheet 30 with a suitable seal and removable to make repairs to tubes if necessary. The door 164 is mounted on a hinge construction 212 carried by the side wall 200 of the chamber 162 and is normally held in closed position by a pair of upper clamps 214 and a lower clamp 216. On small units the hinge 212 may be omitted. The door is lined on its inner surface with a sheet of asbestos or similar material 218 which forms a tight seal at the outer edge of the wall members 200, 206 and 210 when the clamps are firmly engaged.

This split door construction permits the installation of the rear end of the boiler closely adjacent the wall of a room and decreases the overall space required by the boiler, thus permitting greater flexibility in boiler room layout. It is to be noted that each cover section forms a separate seal, the seal in each section being formed in a single plane, thus permitting substantial economy in manufacture. Utilization of the two separate sealed sections also provides positive protection from short circuiting of the combustion gases. For example, if leakage should occur around the periphery of the door section 160, the gases would escape to the boiler room where they would be immediately noticed. There is no possibility of internal leakage which might permit the combustion gases to pass directly to the stack with the attendant danger which would be caused by the immediate raising of the stack temperature.

The boiler of the present invention thus far described may be converted to a wetback construction by the substitution of the rear doors as shown in FIGURES 12–16 for the door assembly 160 and the installation of associated piping for connecting the interior of the door assembly to the interior of the main boiler water compartment.

The door assembly 220 illustrated in FIGURES 12, 13 and 14 comprises an outer sheet metal shell 222 and an inner sheet metal liner 224 secured together by a plurality of tie rods 226 to form a sealed interior chamber filled or substantially filled with water. The interior dimensions of the inner liner 224 are essentially the same as those of the refractory liner 174, thus the inner liner 224 completely surrounds the space occupied by the combustion tube 32 and the second pass fire tubes 34 and thus provides a gas reversal chamber. The outer shell 222 has essentially the same configuration as the outer shell of the door assembly 160 except that it is elongated in its upper portion to provide an integral expansion chamber. As in the case of the dryback door assembly 160, the door assembly 220 is provided with a peripheral strip of asbestos or similar material 228 which provides a gas tight seal in a single plane against the tube sheet 30. It will be noted that the gas reversal chamber formed by the inner liner 224 is surrounded on all sides by water, thus assuring long and trouble free life of the components.

As best shown in FIGURE 12, the wetback door assembly 220 is mounted for swinging movement on a hinge construction 230 which also supports the water connections between the interior of the boiler and the interior of the door 220, thus permitting opening of the door 220 without disconnection of any of the water lines. More specifically, water is conducted from the bottom of the boiler through a conduit 232, through a water tight swivel fitting 234 to a conduit 236 leading to the interior of the water chamber in the door assembly 220. The water rises by convection and leaves the wetback through an outlet conduit 238 connected through a swivel fitting 240 to a return line 242 leading to the top of the main water boiler compartment.

By virtue of this construction the wetback assembly 220 may be swung open to expose the end of the tube sheet, the end of the combustion tube and the end of the fire tubes 34 even when the boiler contains water under pressure, thus permitting direct observation of these parts of the boiler during hydrostatic tests.

The alternate wetback door assembly indicated generally at 244 and shown in FIGURES 15 and 16 is of essentially the same construction as the door assembly 220 except that the top of the door is flattened and the expansion space is provided by a separate cylindrical section 246, the lower end of which is in open communication with the interior of the water space provided by the wetback door assembly.

When the boiler of the present invention is operated to supply hot water, the return water line 250 is preferably positioned substantially centrally of the boiler and at the top thereof. The heated water is removed from the boiler through an outlet conduit 252 at the top of the boiler adjacent the front end thereof. The incoming relatively cold water first is tempered by mixing with the relatively hot water at the top of the boiler and then moves generally in the pattern indicated by the arrows 254 in FIGURE 6 passing first through the third pass tubes 36 toward the bottom of the boiler. Then, after sweeping across the bottom of the boiler, the water is divided into two streams, one passing upwardly through the second pass fire tubes and the other passing to the left of the combustion tube 32, as viewed in FIGURE 6. If desired, this circulation pattern may be promoted by the installation of a flow directing baffle at the inner end of the return conduit 250. By virtue of the unique disposition of the fire tubes and the combustion tubes, a natural thermal circulation pattern is set up which provides the maximum water circulation velocity and the most efficient form of heat transfer namely, counterflow. The natural flow pattern within the boiler assures positive circulation at the bottom of the boiler as well as elsewhere, thus preventing the accumulation of sludge or dirt in this area which has proved troublesome in the past. Also, the natural circulation pattern is such that the coolest water first contacts the coolest boiler surfaces and does not reach the hottest surfaces until it has been thoroughly tempered, resulting in uniform metal temperatures throughout the boiler during all periods of operation and eliminating the possibility of thermal shock or stress. The small amount of make-up water required may be introduced at any convenient location preferably in essentially the same region in which the main return water line is connected.

When the boiler is utilized to generate steam, the water enters the water compartment through an inlet conduit (not shown) preferably located centrally of the boiler and at the side thereof adjacent the upper portion of the third pass fire tubes 36 to assure the achievement of the same flow pattern as that previously described in connection with the hot water boiler. The steam may be removed from the boiler by a conduit at a top central location.

This application is a continuation-in-part of our application Serial No. 73,764, filed December 5, 1960, for Boilers.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A boiler comprising a cylindrical boiler shell, front and rear tube sheets secured to said shell adjacent the opposite ends thereof, a combustion tube extending through said tube sheets, the axis of said combustion tube being laterally offset a substantial distance from the axis of said boiler shell toward one side of said boiler shell, one end of said combustion tube projecting beyond the adjacent tube sheet to dispose one end thereof essentially flush with the end of said shell and being adapted to detachably support a burner, first and second groups of fire tubes extending between said tube sheets in the region between said combustion tube and the other side of said boiler shell, the uppermost of said fire tubes being substantially at the level of the top of said combustion tube, a front cover swingably mounted at the other side of said boiler shell for engagement with the end of said shell and the end of said combustion tube and extending over said first and second groups of fire tubes and around a portion only of said combustion tube, whereby said front cover may be opened without detaching said burner from said combustion tube and a pair of rear doors mounted at the rear of said boiler, means on one of said doors sealingly engaging said tube sheet in the area surrounding said combustion tube and said first group of fire tubes, and said one of said doors being recessed to form a sealed gas reversal chamber connecting the end of said combustion tube and said first group of fire tubes, and the other door forming a sealed chamber connecting said second group of fire tubes to an exhaust stack, one of said doors extending across a portion of the rear of said boiler and the other door extending across the remainder of the rear of said boiler whereby said doors can be opened independently.

2. A boiler comprising a cylindrical boiler shell, front and rear tube sheets secured to said shell, the rear tube sheet being secured to said shell adjacent the rear end thereof and the front tube sheet being secured to said shell in a region spaced from the front end of said shell, a combustion tube extending between and through said tube sheets and having one end substantially flush with the projecting front end of said boiler shell, said one end of said combustion tube being adapted to detachably support a burner, the axis of said combustion tube being laterally offset a substantial distance from the axis of said boiler shell toward one side of said boiler, groups of fire tubes extending between and through said tube sheets in the region between said combustion tube and the other side of said boiler shell, a front cover swingably mounted on said other side of boiler shell and extending over said groups of fire tubes and around a portion only of said combustion tube and adapted to seal against the projecting front end of said boiler shell and against a fixed portion of said combustion tube whereby said cover may be open to expose said front tube sheet without disturbing said burner, and a pair of rear doors covering the rear of said boiler, a planar peripheral seal carried by one of said doors adapted to seal against said tube sheet to form a sealed gas reversal chamber at the rear end of said combustion tube, one of said doors extending across a portion of the rear of said boiler and the other door extending across the remainder of the rear of said boiler whereby said doors can be opened independently.

References Cited by the Examiner

UNITED STATES PATENTS

| | | | |
|---|---|---|---|
| 1,835,091 | 12/1931 | Roucka | 122—149 |
| 2,548,287 | 4/1951 | Blake | 122—149 X |
| 2,604,081 | 7/1952 | Henc | 122—149 |
| 2,674,981 | 4/1954 | Clarkson | 122—149 |
| 2,904,015 | 9/1959 | Penning | 122—149 |
| 3,056,389 | 10/1962 | Gething | 122—406 |

OTHER REFERENCES

German printed application, 1,004,200, March 1957 (1 sht. dwg., 3 pp. spec.).

KENNETH W. SPRAGUE, *Primary Examiner.*

FREDERICK L. MATTESON, *Examiner.*